United States Patent
Nishimura et al.

(10) Patent No.: US 11,079,238 B2
(45) Date of Patent: Aug. 3, 2021

(54) CALCULATING A MOST PROBABLE PATH

(71) Applicant: International Business Machines Corporation, Armonk, NY (US)

(72) Inventors: Yasutaka Nishimura, Yamato (JP); Shoichiro Watanabe, Tokyo (JP); Sanehiro Furuichi, Setagaya-ku (JP); Kenichi Takasaki, Shibuya (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 141 days.

(21) Appl. No.: 16/202,380

(22) Filed: Nov. 28, 2018

(65) Prior Publication Data

US 2020/0166345 A1    May 28, 2020

(51) Int. Cl.
- *G01C 21/20* (2006.01)
- *G01C 21/36* (2006.01)
- *G01C 21/34* (2006.01)
- *G06N 7/00* (2006.01)

(52) U.S. Cl.
CPC ......... *G01C 21/20* (2013.01); *G01C 21/3484* (2013.01); *G01C 21/3691* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 6,317,686 B1* | 11/2001 | Ran | G01C 21/3691 701/117 |
| 7,899,611 B2* | 3/2011 | Downs | G08G 1/0962 701/117 |
| 2006/0149461 A1* | 7/2006 | Rowley | G01C 21/3605 701/423 |
| 2010/0010733 A1 | 1/2010 | Krumm | |
| 2017/0205242 A1* | 7/2017 | Schmidt | G06F 16/29 |
| 2018/0094943 A1* | 4/2018 | Grochocki, Jr. | G01C 21/3415 |

FOREIGN PATENT DOCUMENTS

| | | |
|---|---|---|
| CN | 105512727 B | 2/2018 |
| CN | 108286980 A | 7/2018 |
| EP | 3214406 A1 | 9/2017 |

OTHER PUBLICATIONS

Zhao, "Vehicle Navigation and Information Systems", 1999, Encyclopedia of Electrical & Electronics Engineering, 1st Edition, vol. 23, p. 106-118 (Year: 1999).*

\* cited by examiner

*Primary Examiner* — Tamara L Weber
(74) *Attorney, Agent, or Firm* — Fabian VanCott; Steven L. Nichols

(57) ABSTRACT

A method of calculating a most probable path (MPP) comprising: with a classification module, classifying each of a plurality of origin and destination (O/D) trajectories into one of a plurality of periods of time, the classification comprising: changing a data sampling time period of any of the plurality of trajectories within the determined classification periods; with the classification module, detecting any O/D data descriptive of an aperiodic O/D trajectory using context data descriptive of the aperiodic O/D trajectory; and with the classification module, calculating a route trajectory serving as a candidate of the MPP to determine a priority O/D trajectory that matches the context data.

25 Claims, 6 Drawing Sheets

505 →

| RP | Weather Condition | Days | Holiday | Day Before Holiday | Event | Road Event | Origin | POI Campaign |
|----|-------------------|----------|---------|--------------------|-------|------------|--------|--------------|
| A  | Rain              | Saturday | 1       | 0                  | 0     | 0          | A      | 0            |
| A  | Rain              | Sunday   | 1       | 0                  | 1     | 0          | A      | 0            |
| B  | Fine              | Monday   | 1       | 0                  | 0     | 0          | A      | 1            |
| C  | Snow              | Friday   | 0       | 1                  | 1     | 1          | B      | 0            |
| D  | Heavy Rain        | Friday   | 0       | 1                  | 1     | 1          | B      | 0            |
| D  | Rain              | Sunday   | 1       | 0                  | 1     | 0          | B      | 0            |
| F  | Fine              | Saturday | 1       | 0                  | 0     | 0          | A      | 1            |
| F  | Rain              | Sunday   | 1       | 0                  | 0     | 0          | A      | 1            | ated

CALCULATING A MOST PROBABLE PATH

BACKGROUND

Commuting or otherwise moving about in our environment has increased in complexity as a result of increases in population. Indeed, as the number of roads increases, the ability to navigate through a person's environment increases in complexity. Global positioning satellite (GPS) systems have increased the efficiency of navigating through their environment. In some examples, these GPS systems may update roads created on a certain time interval.

SUMMARY

According to one embodiment of the present invention a method of calculating a most probable path (MPP) comprises, with a classification module, class ring each of a plurality of origin and destination (O/D) trajectories into one of a plurality of periods of time, the classification comprising: changing a data sampling time period of any of the plurality of trajectories within the determined classification periods; with the classification module, detecting any O/D data descriptive of an aperiodic O/D trajectory using context data descriptive of the aperiodic O/D trajectory; and with the classification module, calculating a route trajectory serving as a candidate of the MPP to determine a priority O/D trajectory that matches the context data.

According to one embodiment of the present invention a system for determining the most probable path (MPP) comprises a processor; a classification module to, when executed by the processor: change a data sampling time period of any of the plurality of trajectories within the determined classification periods; detect any O/D data descriptive of any O/D trajectory temporally longer than the determined classification periods based on context data descriptive of the aperiodic O/D trajectory; with the classification module, calculating a route trajectory serving as a candidate of the MPP to determine a priority O/D trajectory that matches the context data.

According to one embodiment of the present invention, a computer program product for determining the most probable path (MPP), the computer program product comprises a computer readable storage medium having program instructions embodied therewith, the program instructions executable by a processor to cause the processor to: classify each of a plurality of origin and destination (O/D) trajectories into one of a plurality of periods of time; change a data sampling time period of any of the plurality of trajectories within the determined classification periods; detect any O/D data descriptive of an aperiodic O/D trajectory using context data descriptive of the aperiodic O/D trajectory; calculate a route trajectory serving as a candidate of the MPP to determine a priority O/D trajectory that matches the context data.

According to one embodiment of the present invention, a method of calculating a most probable path (MPP) comprises, with a classification module, classifying each of a plurality of origin and destination (O/D) trajectories into one of a plurality of periods of time, the classification comprising: changing a data sampling time period of any of the plurality of trajectories within the determined classification periods; with the classification module, detecting any O/D data descriptive of a relatively longer trajectory having a temporal longevity longer than any of the determined classification periods using context data descriptive of the relatively longer trajectory; with the classification module, calculating a route trajectory serving as a candidate of the MPP to determine a priority O/D trajectory that matches the context data.

BRIEF DESCRIPTION OF THE SEVERAL VIEWS OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

Figure 1:
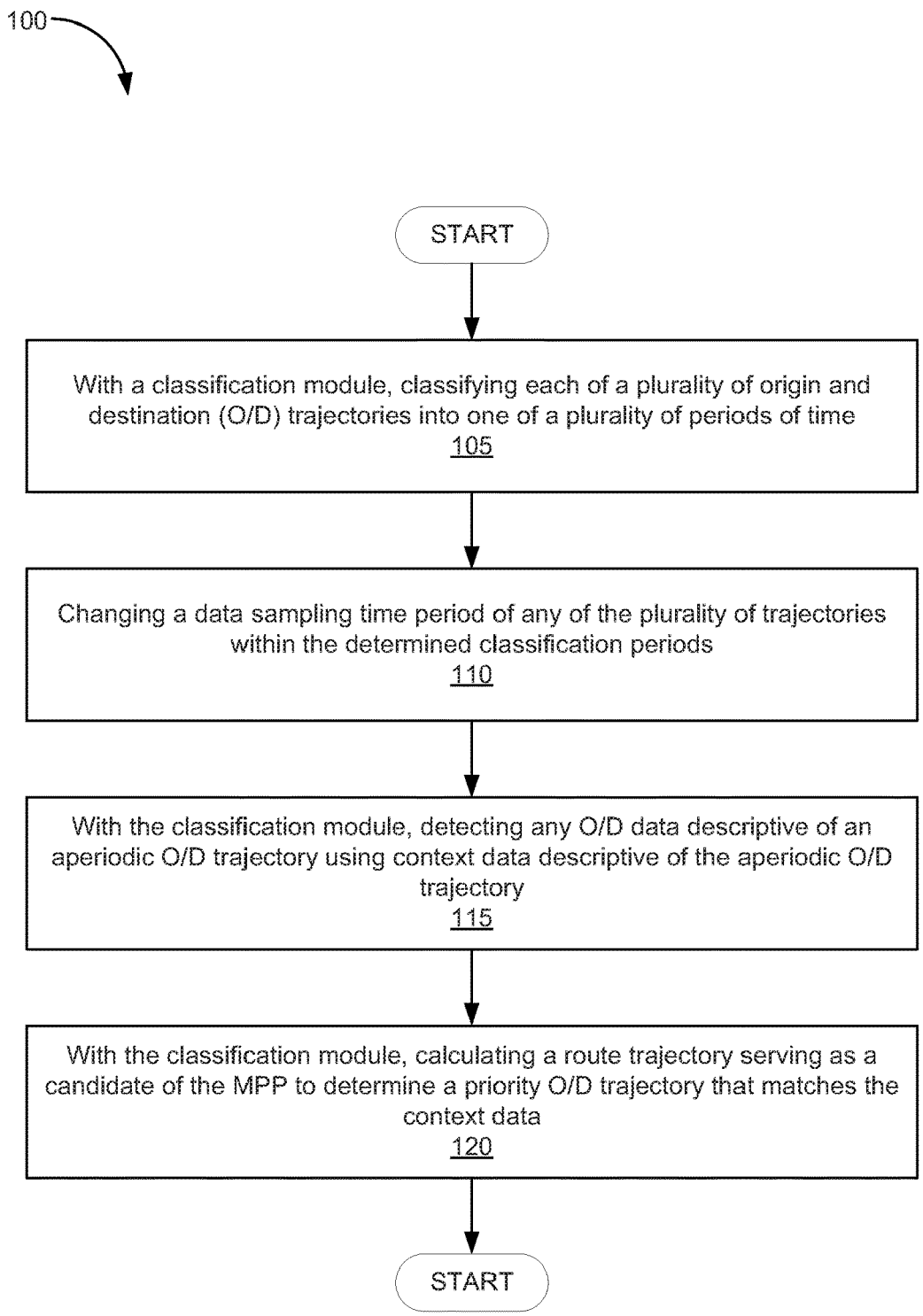
FIG. 1 is a flowchart showing a method of calculating a most probable path (MPP) according to one example of principles described herein.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

In the present specification and in the appended claims, the term "a number of" or similar language is meant to be understood broadly as any positive number comprising 1 to infinity; zero not being a number, hu the absence of a number.

With the advent of the global positioning satellite (GPS) systems, travelers may more easily navigate their environment. This is true for any type of locomotion chosen including walking, cars, trains, subways, etc. Indeed, these GPS systems may provide a list of directions to a user on how to best navigate their environment. However, with the advent of advanced driver assistance systems (ADAS) and other types of automatic driving technologies for vehicles, the trajectories selected for these systems may determine the number and possibilities of property damage and personal injury resulting from crashes. Indeed, these automatic driving technologies may encompass a determination of a trajectory having the highest passing probability on the basis of the current drive trajectory and previous statistics often called the most probable path (MPP). The MPP may be developed based on the accumulation of trajectory data as the system learns what or may be the most probable path.

However, during a process of developing the MPP based on the accumulation of the trajectory data, the accumulation has been limited to the most recently captured data items aggregated under specific tune periods such as every three months or every year. This was done to merely keep the captured data updated for the system to operate. By limiting the data capture, those trajectories (defined by an origin and destination (O/D)) that occur on an infrequent basis are determined to be out of the scope of the trajectory data used to form the MPP. Still further, an increase in the data items learned within these set periods of time cannot support changes in maps and variations in the environment used to develop the MPP.

The present specification describes a method of calculating a most probable path (MPP) comprising: with a classification module, classifying each of a plurality of origin and destination (O/D) trajectories into one of a plurality of periods of time, the classification comprising: changing a data sampling time period of any of the plurality of trajectories within the determined classification periods; with the classification module, detecting any O/D data descriptive of an aperiodic O/D trajectory using context data descriptive of the aperiodic O/D trajectory; and with the classification module, calculating a route trajectory serving as a candidate of the MPP to determine a priority O/D trajectory that matches the context data.

The present specification also describes a system for determining the most probable path (MPP) comprising: a processor; a classification module to, when executed by the processor: change a data sampling time period of any of the plurality of trajectories within the determined classification periods; detect any O/D data descriptive of any O/D trajectory temporally longer than the determined classification periods based on context data descriptive of the aperiodic O/D trajectory; with the classification module, calculating a route trajectory serving as a candidate of the MPP to determine a priority O/D trajectory that matches the context data.

The present specification also describes a computer program product for determining the most probable path (MPP), the computer program product comprising a computer readable storage medium having program instructions embodied therewith, the program instructions executable by a processor to cause the processor to: classify each of a plurality of origin and destination (O/D) trajectories into one of a plurality of periods of time; change a data sampling time period of any of the plurality of trajectories within the determined classification periods; detect any O/D data descriptive of an aperiodic O/D trajectory using context data descriptive of the aperiodic O/D trajectory; calculate a route trajectory serving as a candidate of the MPP to determine a priority O/D trajectory that matches the context data.

The present specification also describes a method of calculating a most probable path (MPP) comprising: with a classification module, classifying each of a plurality of origin and destination (O/D) trajectories into one of a plurality of periods of time, the classification comprising: changing a data sampling time period of any of the plurality of trajectories within the determined classification periods; with the classification module, detecting any O/D data descriptive of a relatively longer trajectory having a temporal longevity longer than any of the determined classification periods using context data descriptive of the relatively longer trajectory; with the classification module, calculating a route trajectory serving as a candidate of the MPP to determine a priority O/D trajectory that matches the context data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a flowchart showing a method (100) of calculating a most probable path (MPP) according to one example of principles described herein. The method may be executed by a processor of a computing device. In an example, the computing device may include servers, desktop computers, laptop computers, personal digital assistants (PDAs), mobile devices, smartphones, gaming systems, and tablets, among other computing devices. The computing device may be utilized in any data processing scenario including, standalone hardware, mobile applications, through a computing network, or combinations thereof. Further, the computing device may be used in a computing network, a public cloud network, a private cloud network, a hybrid cloud network, other forms of networks, or combinations thereof. In one example, the methods described herein may be provided as a service over a network by, for example, a third party using the computing device. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device are executed by a local administrator.

To achieve its desired functionality, the computing device comprises various hardware components. Among these hardware components may be a number of processors, a number of data storage devices, a number of peripheral device adapters, and a number of network adapters. These hardware components may be interconnected through the use of a number of busses and/or network connections. In one example, the processor, data storage device, peripheral device adapters, and a network adapter may be communicatively coupled via a bus.

The processor may include the hardware architecture to retrieve executable code from the data storage device and execute the executable code. The executable code may, when executed by the processor, cause the processor to implement at least the functionality of the processes of the methods of the present specification described herein. In the course of executing code, the processor may receive input from and provide output to a number of the remaining hardware units.

The data storage device may store data such as executable program code that is executed by the processor or other processing device. The data storage device may specifically store computer code representing a number of applications that the processor executes to implement at least the functionality described herein. The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor may boot from Read Only Memory (ROM), maintain nonvolatile storage in the Hard Disk Drive (HDD) memory, and execute program code stored in Random Access Memory (RAM).

The method (100) executed, in an example, by a processor may include, with a classification module, classifying (105) each of a plurality of origin and destination (O/D) trajectories into one of a plurality of periods of time. In an example, the classification module is in the form of an application specific integrated circuit (ASIC) that is accessed by a processor of the computing device. In an example, the classification module is in the form of computer processor executable program code. In this example, the processor may execute this computer processor executable program code in order to affect the functionality of the method (100) described herein.

The classification (105) of the plurality of origin and destination (O/D) trajectories into one of the plurality of periods of time includes changing (110) a data sampling period of any of the plurality of trajectories within the determined classification periods and detecting (115) any O/D data descriptive of, in an example, an aperiodic O/D trajectory. As described herein, the aperiodic O/D trajectories are those O/D trajectories that do not occur on aperiodic basis such as every day, every Sunday, on the same day of a month, etc. Instead, these aperiodic O/D trajectories may randomly occur at any time during a given period and may not occur on a predictable day of the year. In some examples, an aperiodic O/D trajectory may occur once during the longest classification period of time such as a year. In order to achieve this, therefore, the classification module may change a data sampling time period so as to detect any of these O/D trajectories that may fall within an aperiodic time period.

Although the present example describes the detection (115) of those O/D trajectories that include data descriptive of an aperiodic O/D trajectory, the present specification contemplates that other O/D trajectories that fall within other time periods may also be detected. Thus, the present methods can also be used to detect (115) and classify (105) any O/D trajectory that falls within any length of time. By way of example, an O/D trajectory recorded by a processor that occurs once on the same day every year may be detected (115) and classified (105) into a, in this example, a year time period. All of this may be accomplished by a processor reviewing the data descriptive of each of the plurality of O/D trajectories in order to complete the classification (110).

In an example, the data reviewed associated with each of the plurality of OD trajectories may include any type of data. As part of this data review, the processor may determine the date and frequency of each of the OD trajectories. This classifies each of the OD trajectories on a period-by-period basis with each of these OD trajectories being classified into individual time periods such as a 24-hour periods, weeklong periods, month-long periods, quarterly-long periods, 6 month-long periods, annual periods, and/or aperiodic long periods, among others.

In an example, the classification (105) process may include changing (110) a data sampling period of any of the plurality of trajectories within the determined classification periods. By changing (110) the data sampling period, the any number of O/D trajectories may be clustered in to these individual time periods so that classification (110) may be completed. In an example, the context information used to classify (110) the O/D trajectories may be used to calculate (120) a route trajectory serving as a candidate of the most probable path (MPP) to determine a priority trajectory that matches the context data.

The calculation (120) of the route trajectory serving as the candidate of the most probable path may be conducted using any predictive process including, but not limited to, a hidden Markov Model, clustering, and a deep neural network (DNN), combinations these, among other types of formulations. Where a hidden Markov Model is used, the following may be used to calculate the MPP:

N is the number of states
T is the number of observations
$\theta_{i=1}$ N is the emission parameter for an observation associated with state i
$\phi_{i=1\ldots N, j=1\ldots N}$ is the probability of transition from state i to stale j
$\phi_{i=1\ldots N}$ is the N-dimension vector, composed of $\phi_{i=1\ldots N, j=1\ldots N}$; the i-th row of the matrix N, $\phi_{i=1\ldots N, j=1\ldots N}$ (sum of it is 1)
$x_{t=1\ldots T}$ is the (hidden) state at time t
$y_{t=1\ldots T}$ is the observation at time t
$F(y|\theta)$ is the probability distribution of an observation, parametrized on the $\theta$
$x_{t=2\ldots T}$ is approximately the Categorical($\phi_{xt-1}$) and
$y_{t-1\ldots T}$ is approximately $F(\theta_{xt})$ In this hidden Markov model, the prior distribution of the initial state xi may not be specified.

The present method (100) may be applied with regard to any of a number of drivers, passengers, and or users. In this example, the classification (105) of the O/D trajectories and the calculation (120) of the route trajectory may be done for each driver in a vehicle, passenger in a vehicle, and/or user of the method. Thus, a calculated (120) route trajectory serving as a candidate of the MPP may be dependent on that O/D data associated with each user of the method and may vary on a user-by-user basis. In order to determine the user implementing the method, a processor of the computing device executing the method (100) may further include an identification module to determine the identification of the user interfacing with the computing device. This identification module may be communicatively coupled to a sensor or other interface, for example, in order to receive identifying information indicative of who the user is. Such sensors or interfaces may include iris sensors, fingerprint sensors, face recognition systems, and password reception modules, among others. The present specification, however, contemplates the use of any hardware and/or computer executable program code that requests and accepts identifying information regarding the identity of the user implementing the method.

In an example, the classification module may, when detecting (115) any O/D data descriptive of an aperiodic O/D trajectory may include any type of data from any source. In an example, the context data descriptive of the aperiodic O/D trajectory may include registrant (user) information, weather associated with the aperiodic O/D trajectory, date of the aperiodic O/D trajectory, time of day of the aperiodic O/D trajectory, road events during the aperiodic O/D trajectory, or combinations thereof. As described herein, the registrant (user) information, weather associated with the aperiodic O/D trajectory, date of the aperiodic O/D trajectory, time of day of the aperiodic O/D trajectory, and/or road events during the aperiodic O/D trajectory may be used to create a decision tree and/or decision table. The decision tree and/or decision table may be used to weight certain route trajectories while the classification module calculates (120) the MPP. The weights may be associated with each instance of the aperiodic O/D trajectory detected (115) and used to further refine the calculation (120) of the MPP as described herein.

By way of an example, the method (100) may be executed on a smartphone. In this example, the smartphone may include a processor to execute the computer executable program code defining the classification module described herein. The smartphone may also include a data storage device to maintain any amount of data associated with any recorded historic O/D trajectory sensed by the smartphone's sensors (i.e., GPS sensor, accelerometer, etc.). The classification module may use this data associated with any recorded historic O/D trajectory as described herein to create the decision tree and/or calculate (120) a route trajectory serving as a candidate of the MPP to determine a priority O/D trajectory that matches the context data.

Figure 2:
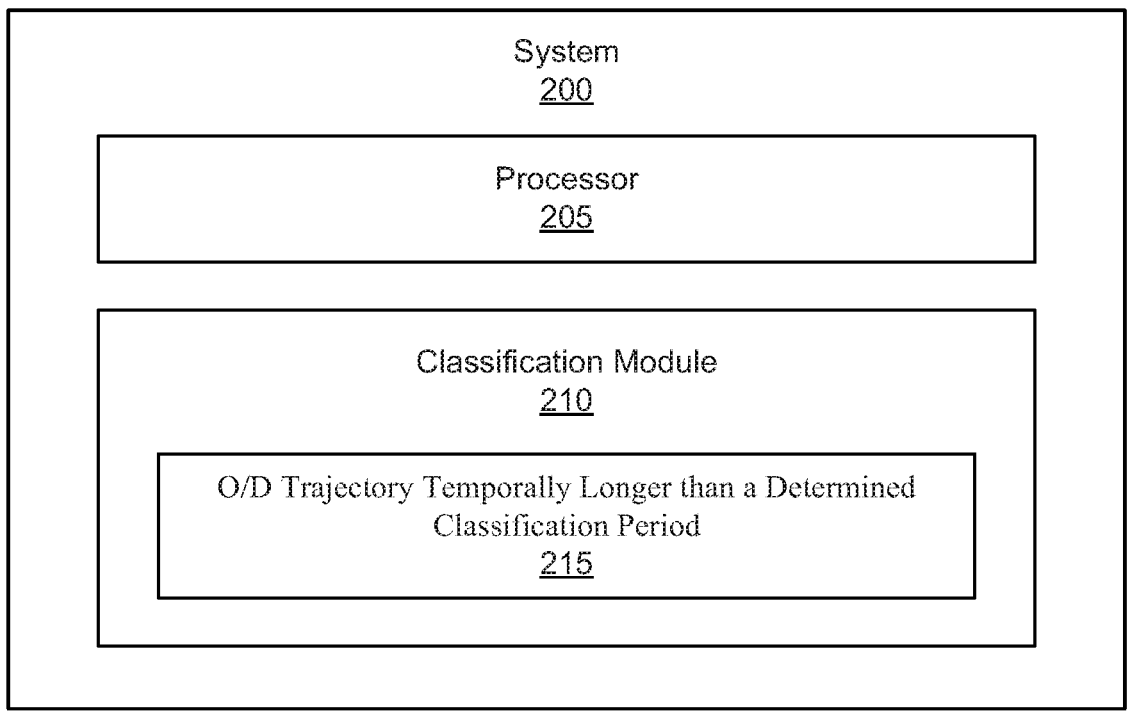
FIG. 2 is a block diagram of a system for determining the most probable path (MPP) according to an example of the principles described herein.

FIG. 2 is a block diagram of a system (200) for determining the most probable path (NIPP) according to an example of the principles described herein. In an example described herein, the system (200) may execute the method (100) described in connection with FIG. 1. In any example presented herein, the system (200) may be in the form of a computing device or a plurality of computing devices operating over a network. As described herein, the computing device may include the processor (205) capable of executing computer readable program code. In an example, the processor (205) may execute computer readable program code defining the classification module (210). In this example, the classification module (210) may be in the form of stand-alone computer executable program code maintained on a tangible medium such as a data storage device. In another example, the processor (205) may interface with a classification module (210) in the form of an application specific integrated circuit (ASIC).

The classification module (210) may, when executed by the processor (205), change a data sampling time period of any of the plurality of trajectories within the determined classification periods and detect any O/D data descriptive of any O/D trajectory temporally longer than the determined classification periods based on context data descriptive of the aperiodic O/D trajectory. This may be done so as to classify each of these O/D trajectories stored on the data storage device. Additionally, in this example, the classification module (210) may detect any O/D data associated with any of the stored O/D trajectories that is descriptive of an O/D trajectory that is temporally longer than the changed data sampling time period.

In an example the classification module (210) may calculate a route trajectory serving as a candidate of the MPP to determine a priority O/D trajectory that matches the context data. As described herein, the calculation may involve weighting certain trajectories and forming a decision tree in order to calculate the MPP. The decision tree may be stored on the data storage device for access during the calculation process. Still further, as additional data points (O/D trajectories) are recorded by the processor (205) of the system (200), the data used to form the decision tree may update the decision tree.

Figure 3:
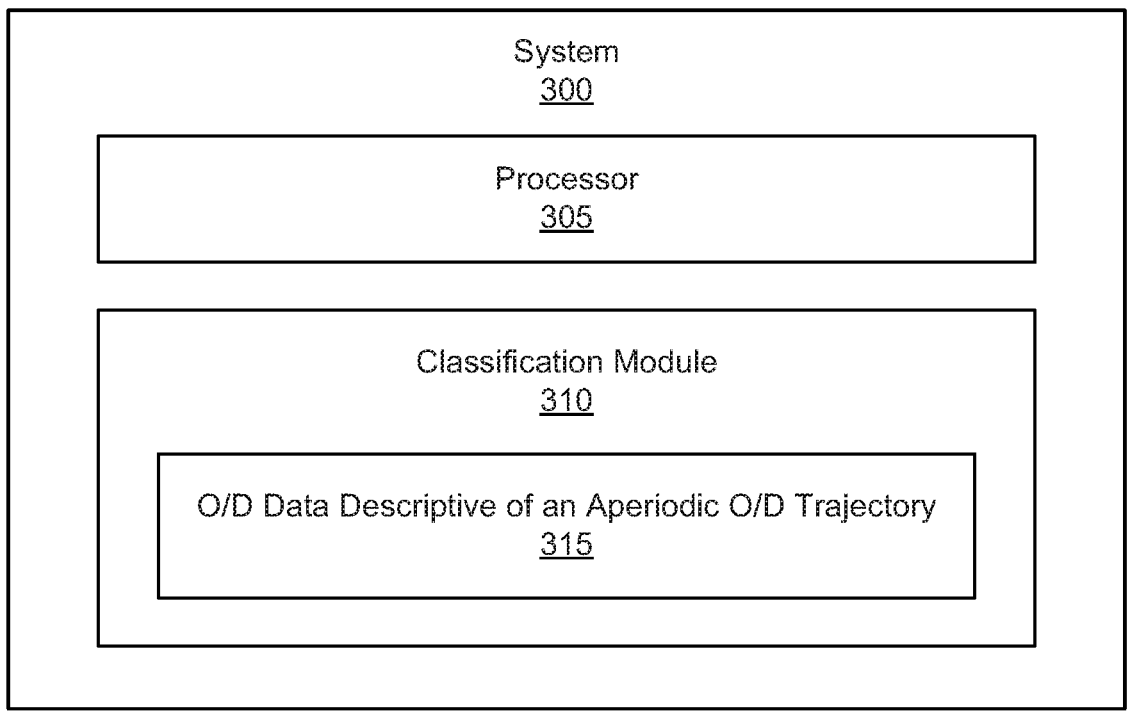
FIG. 3 is another block diagram of a system for determining the most probable path (MPP) according to an example of the principles described herein.

FIG. 3 is another block diagram of a system (300) for determining the most probable path (MPP) according to an example of the principles described herein, Similar to FIG. 2, the system (300) of FIG. 3 also includes a processor (305) and a classification module (310). Again, the processor (305) may interface with the classification module (310) to change a data sampling time period of any of the plurality of trajectories within the determined classification periods; detect any O/D data descriptive of any O/D data descriptive of an aperiodic O/D trajectory based on context data descriptive of the aperiodic O/D trajectory; and with the classification module, calculating a route trajectory serving as a candidate of the MPP to determine a priority O/D trajectory that matches the context data. In this example, the classification module may determine that any of the plurality of O/D trajectories are or are not aperiodic O/D trajectories and, when an aperiodic O/D trajectory is detected, the system (300) calculates a route trajectory serving as a candidate of the MPP to determine a priority O/D trajectory that matches the context data.

Figure 4:
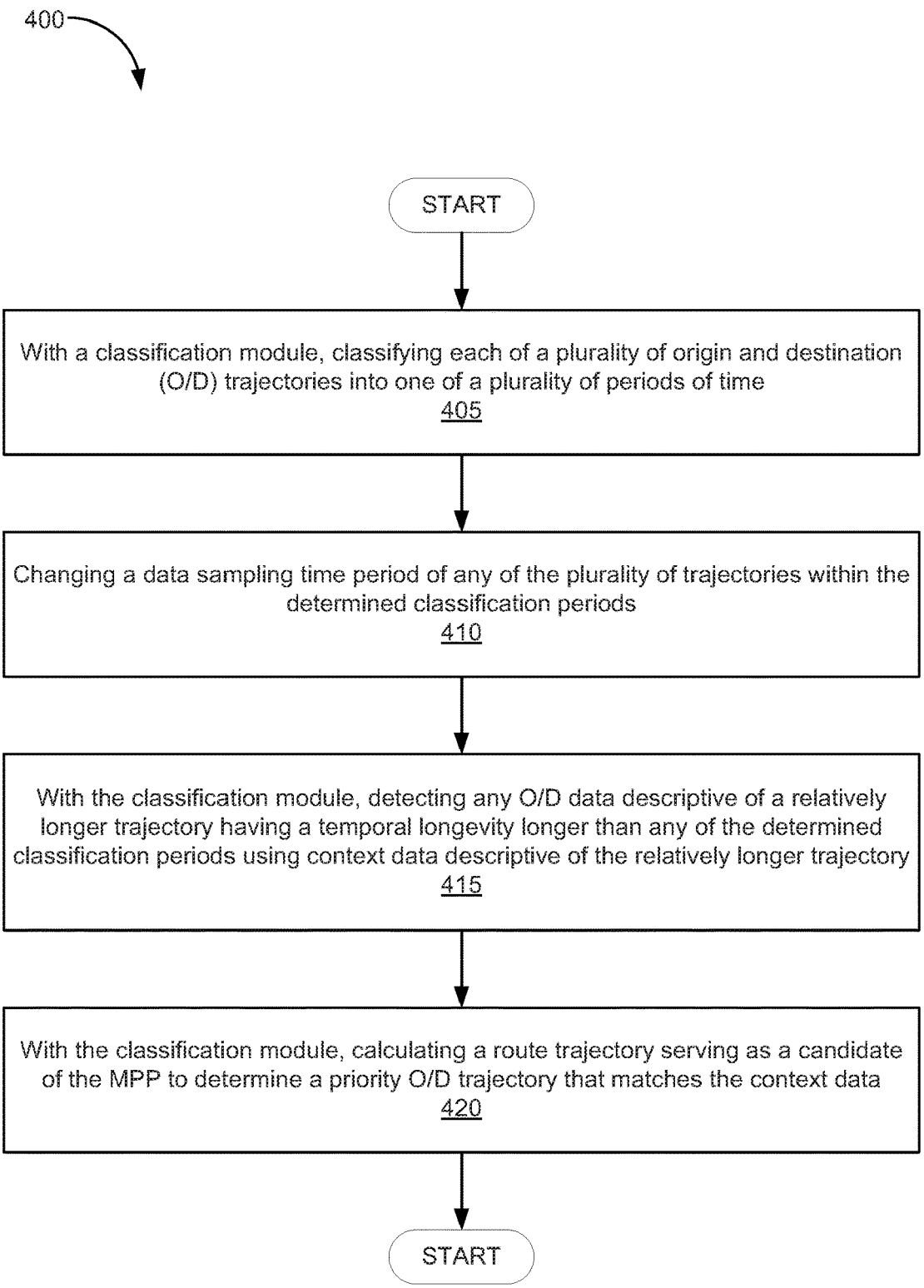
FIG. 4 is a flowchart showing a method of (labeling an optical disk), according to one example of principles described herein.

FIG. 4 is a flowchart showing a method (400) of calculating a most probable path (MPP) according to one example of principles described herein. Similar to the method (100) described in connection with FIG. 1, the method (400) may include, with classification module, classifying (405) each of a plurality of origin and destination (O/D) trajectories into one of a plurality of periods of time. In an example, the classification module is in the form of an application specific integrated circuit (ASIC) that is accessed by a processor of the computing device. In an example, the classification module is in the form of computer processor executable program code in this example, the processor may execute this computer processor executable program code in order to affect the functionality of the method (400) described herein, The classification (405) of the plurality of origin and destination (O/D) trajectories into one of the plurality of periods of time includes changing (410) a data sampling period of any of the plurality of trajectories within the determined classification periods and detecting (415) any O/D data descriptive of a relatively longer trajectory having a temporal longevity longer than any of the determined classification periods using context data descriptive of the relatively longer trajectory. As described herein, the relatively longer trajectory having a temporal longevity longer than any of the determined classification periods may be those O/D trajectories that are longer in time than a day, a week, a month, a year, or any other defined period of time. Again, the present methods can also be used to detect (415) and classify (405) any O/D trajectory that falls within any length of time. By way of example, an O/D trajectory recorded by a processor that occurs once on the same clay every year may be detected (415) and classified (405) into a, in this example, a year time period. All of this may be accomplished by a processor reviewing the data descriptive of each of the plurality of O/D trajectories in order to complete the classification (410).

In an example, the data reviewed associated with each of the plurality of OD trajectories may include any type of data. As part of this data review, the processor may determine the date and frequency of each of the OD trajectories. This classifies each of the OD trajectories on a period-by-period basis with each of these OD trajectories being classified into individual time periods such as a 24-hour periods, week-long periods, month-long periods, quarterly-long periods, 6 month-long periods, annual periods, and/or aperiodic long periods, among others.

In an example, the classification (405) process may include changing (410) a data sampling period of any of the plurality of trajectories within the determined classification periods. By changing (410) the data sampling period, the any number of O/D trajectories may be clustered in to these individual time periods so that classification (410) may be completed. In an example, the context information used to classify (410) the O/D trajectories may be used to calculate (420) a route trajectory serving as a candidate of the most probable path (MPP) to determine a priority I/D trajectory that matches the context data.

The present method (400) may be applied with regard to any of a number of drivers, passengers, and or users. In this example, the classification (405) of the O/D trajectories and the calculation (420) of the route trajectory may be done for each driver in a vehicle, passenger in a vehicle, and/or user of the method. Thus, a calculated (420) route trajectory serving as a candidate of the MPP may be dependent on that O/D data associated with each user of the method and may vary on a user-by-user basis. In order to determine the user implementing the method, a processor of the computing device executing the method (400) may further include an identification module to determine the identification of the user interfacing with the computing device. This identification module may be communicatively coupled to a sensor or other interface, for example, in order to receive identifying information indicative of who the user is. Such sensors or interfaces may include iris sensors, fingerprint sensors, face recognition systems, and password reception modules, among others. The present specification, however, contemplates the use of any hardware and/or computer executable program code that requests and accepts identifying information regarding the identity of the user implementing the method.

In an example, the classification module may, when detecting (415) any O/D data descriptive of a relatively longer trajectory having a temporal longevity longer than any of the determined classification periods may include any type of data from any source. In an example, the context data descriptive of the relatively longer trajectory may include registrant (user) information, weather associated with the relatively longer trajectory, date of the relatively longer trajectory, time of day of the relatively longer trajectory, road events during the relatively longer trajectory, or combinations thereof. As described herein, the registrant (user) information, weather associated with the relatively longer trajectory, date of the relatively longer trajectory, time of day of the relatively longer trajectory, and/or road events during the relatively longer trajectory may be used to create a decision tree and/or decision table. The decision tree and/or decision table may be used to weight certain route trajectories while the classification module calculates (420) the MPP. The weights may be associated with each instance of the relatively longer trajectory detected (415) and used to further refine the calculation (420) of the MPP as described herein.

By way of an example, the method (400) may be executed on a smartphone. In this example, the smartphone may include a processor to execute the computer executable program code defining the classification module described herein. The smartphone may also include a data storage device to maintain any amount of data associated with any recorded historic O/D trajectory sensed by the smartphone's sensors (i.e., GPS sensor, accelerometer, etc.). The classification module may use this data associated with any recorded historic O/D trajectory as described herein to create the decision tree and/or calculate (420) a route trajectory serving as a candidate of the MPP to determine a priority O/D trajectory that matches the context data.

Figures 5A, 5B:
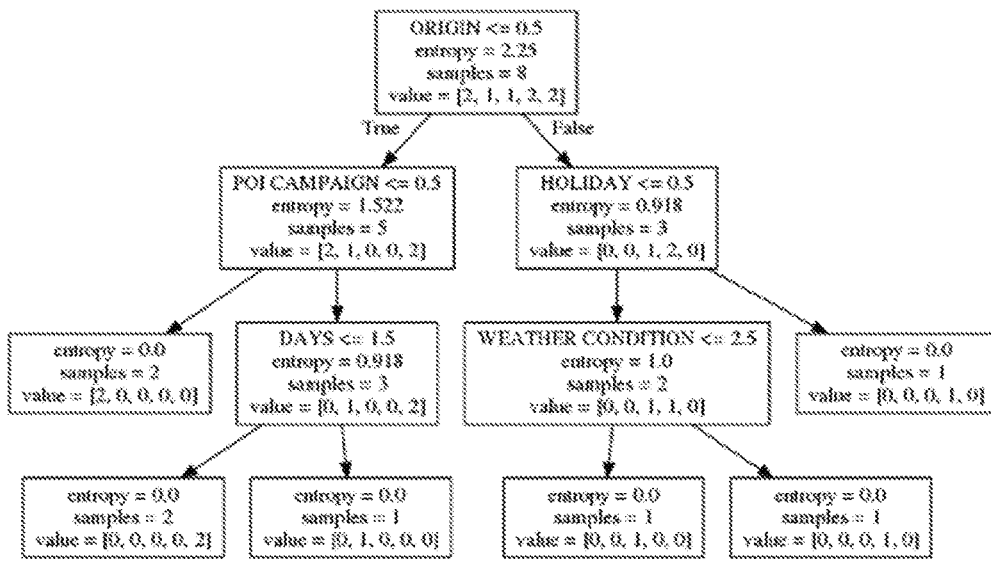
FIGS. 5A and 5B show learning context data and a decision tree, respectively, used to calculate a route trajectory serving as a candidate of an MPP according to an example of the principles described herein.

FIGS. 5A and 5B show learning context data (505) and a decision tree (510), respectively, used to calculate a route trajectory serving as a candidate of an MPP according to an example of the principles described herein. The learning context data (505) may be formed into a table describing a route pattern, weather conditions experienced on that route, the day the route took place, whether that day was a holiday or not ("0"=negative; "1"=positive), whether that day was the day before a holiday or not ("0"=negative; "1" positive); whether there was an event along that route ("0"=negative; "1"=positive); whether there was a traffic event along that route ("0"=negative; "1"=positive); the origin of that route; and whether the destination was a point of interest along that route.

All of the information from the learning context data (505) may be placed into a decision tree (510). Weights may be assigned to any given origin of an O/D trajectory such that with the classification module, a route trajectory serving as a candidate of the MPP may be calculated in order to determine a priority O/D trajectory that matches the context data.

Figure 6:
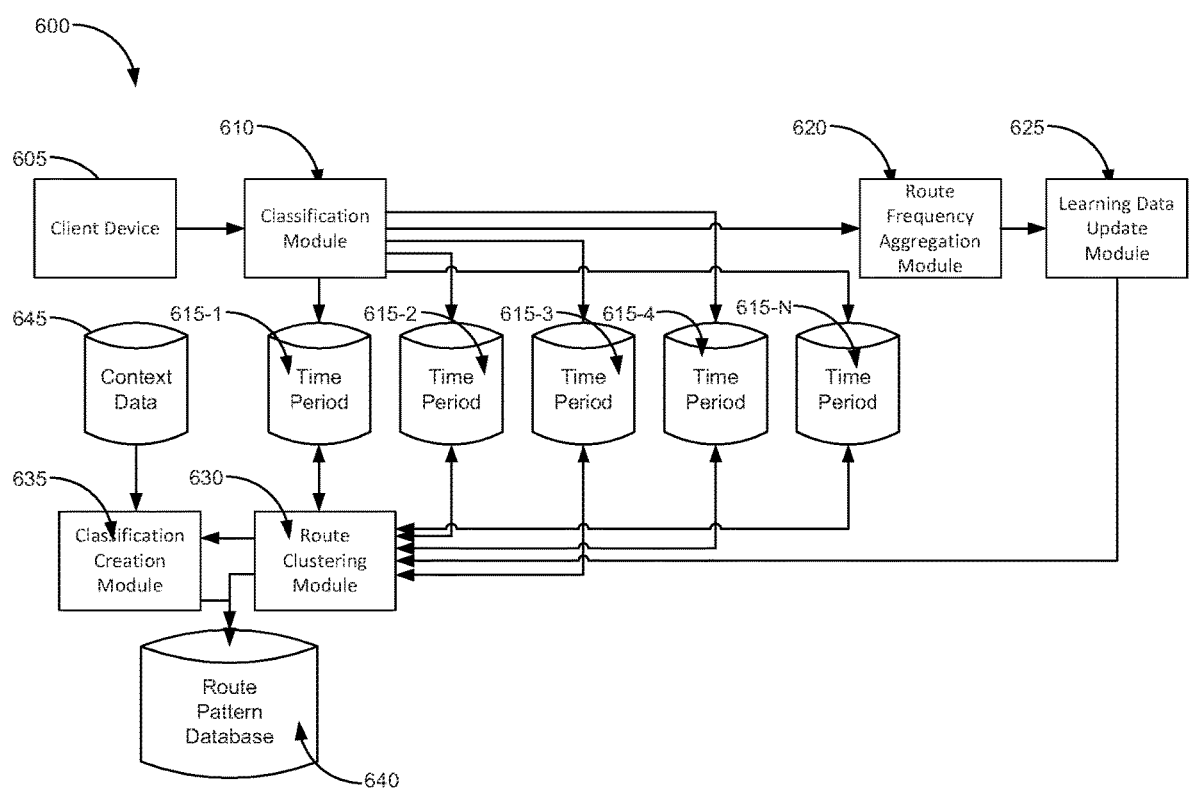
FIG. 6 is a schematic showing a system configuration according to an example of principles described herein.

FIG. 6 is a schematic showing a system (600) configuration according to an example of principles described herein. The system (600) may include a client device (605) communicatively coupled to a classification module (610). The classification module (610) may classify a number of origination and destination (O/D) trajectories into a number of time periods (615-1, 615-2, 615-3, 615-4, 615-N), After classification, each of the O/D trajectories may be aggregated using a route frequency aggregation module (620). The route frequency aggregation module (620) may be communicatively coupled to a learning data update module (625). All data received and aggregated by the route frequency aggregation module (620) may be received by the learning data update module (625). The learning data update module (625) may interactively provide data to each of the time periods (615-1, 615-2, 615-3, 615-4, 615-N) so as to refine the learning process in order to provide this data in order to eventually calculate a route trajectory serving as a candidate of the MPP. Learned data from the learning data update module (625) may be sent to and received by a route clustering module (630) that may cluster the learned O/D trajectories into a group and provide them to a classification creation module (635). The classification creation module (635) may, with context information associated with each of the O/D trajectories calculate a route trajectory serving as a candidate of the MPP so as to determine a priority O/D trajectory that matches that context data (645), Data from both the route clustering module (630) and classification creation module (635) may be saved in a route pattern database (640) for future reference and use by the classification module (610) as described herein.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems

What is claimed is:

1. A method of calculating a most probable path (MPP) comprising:
with a classification module, classifying each of a plurality of origin and destination (O/D) trajectories into one of a plurality of periods of time, the classification comprising:
changing a data sampling time period of any of the plurality of trajectories within the determined classification periods, wherein a first time period is used for periodic O/D trajectories and a second, longer time period is used for aperiodic O/D trajectories; and
with the classification module, detecting any O/D data descriptive of an aperiodic O/D trajectory using context data descriptive of the aperiodic O/D trajectory;
with the classification module, calculating a route trajectory serving as a candidate of the MPP to determine a priority O/D trajectory that matches the context data; and
navigating a vehicle on the most probable path from origin to destination.

2. The method of claim 1, wherein the classification of each of a plurality of O/D trajectories is associated with any of a number of drivers and passengers.

3. The method of claim 2, wherein the MPP is determined based on an identity of the drivers and passengers.

4. The method of claim 1, wherein the context data comprises registrant information, weather, date, time of day, road events, or combinations thereof.

5. The method of claim 1, wherein each of the origin and destination (O/D) trajectories are associated with a weight for the O/D trajectories classification.

6. The method of claim 5, wherein the weight is used to create a decision tree based on the context data.

7. The method of claim 1, wherein the aperiodic O/D trajectory is period temporally longer than a year.

8. A system for determining the most probable path (MPP) comprising:
a processor;
a classification module to, when executed by the processor:
determine a date and frequency of each O/D trajectory;
classify each of the O/D trajectories into one of a plurality of periods of time based on its date and frequency;
change a data sampling time period of any of the plurality of trajectories within the determined classification periods; and
detect any O/D data descriptive of any O/D trajectory temporally longer than the determined classification periods based on context data descriptive of an aperiodic O/D trajectory; and
with the classification module, calculating a route trajectory serving as a candidate of the MPP to determine a priority O/D trajectory that matches the context data, using a hidden Markov model, and with the classification module, providing the calculated route trajectory to a navigation system to guide a vehicle from origin to destination.

9. The system of claim 8, wherein the classification of each of a plurality of O/D trajectories is associated with any of a number of drivers and passengers.

10. The system of claim 9, wherein the MPP is determined based on an identity of the drivers and passengers.

11. The system of claim 8, wherein the context data comprises registrant information, weather, date, time of day, road events, or combinations thereof.

12. The system of claim 8, wherein each of the origin and destination (O/D) trajectories are associated with a weight for the O/D trajectories classification.

13. The system of claim 12, wherein the weight is used to create a decision tree based on the context data.

14. The system of claim 13, wherein the decision tree is stored on a data storage device and used to iteratively determining the most probable path (MPP).

15. A computer program product for determining the most probable path (MPP), the computer program product comprising a non-transient computer readable storage medium having program instructions embodied therewith, the program instructions executable by a processor to cause the processor to:
classify each of a plurality of origin and destination (O/D) trajectories into one of a plurality of periods of time;
change a data sampling time period of any of the plurality of trajectories within the determined classification periods;
detect any O/D data descriptive of an aperiodic O/D trajectory using context data descriptive of the aperiodic O/D trajectory, wherein an aperiodic O/D trajectory is an O/D trajectory that does not occur on a periodic basis;
calculate a route trajectory serving as a candidate of the MPP to determine a priority O/D trajectory that matches the context data, using a deep neural network (DNN); and
provide the calculated route trajectory to a navigation system to navigate a vehicle from origin to destination.

16. The computer program product of claim 15, wherein the classification of each of a plurality of O/D trajectories is associated with any of a number of drivers and passengers.

17. The computer program product of claim 16, wherein the MPP is determined based on an identity of the drivers and passengers.

18. The computer program product of claim 15, wherein the context data comprises registrant information, weather, date, time of day, road events, or combinations thereof.

19. The computer program product of claim 15, wherein each of the origin and destination (O/D) trajectories are associated with a weight for the O/D trajectories classification.

20. The computer program product of claim 19, wherein the weight is used to create a decision tree based on the context data.

21. A method of calculating a most probable path (MPP) comprising:
with an identification module, identifying a user of a computing device;
with a classification module, classifying each of a plurality of origin and destination (O/D) trajectories into one of a plurality of periods of time based on an identity of the user, the classification comprising:

changing a data sampling time period of any of the plurality of trajectories within the determined classification periods;

detecting any O/D data descriptive of an aperiodic O/D trajectory using context data descriptive of the aperiodic O/D trajectory, wherein an aperiodic O/D trajectory is an O/D trajectory that occurs once during a longest classification period, wherein the context data indicates whether a date is within a day range of a holiday;

with the classification module, detecting any O/D data descriptive of a relatively longer trajectory having a temporal longevity longer than any of the determined classification periods using context data descriptive of the relatively longer trajectory;

with the classification module, calculating a route trajectory serving as a candidate of the MPP to determine a priority O/D trajectory that matches the context data, using a deep neural network; and navigating a vehicle from origin to destination using the MPP.

22. The method of claim 21, wherein the classification of each of a plurality of O/D trajectories is associated with any of a number of drivers and passengers.

23. The method of claim 22, wherein the MPP is determined based on an identity of the drivers and passengers.

24. The method of claim 21, wherein the context data comprises registrant information, weather, date, time of day, road events, or combinations thereof.

25. The method of claim 21, wherein each of the origin and destination (O/D) trajectories are associated with a weight for the O/D trajectories classification.

* * * * *